US011506791B2

(12) United States Patent
Simon et al.

(10) Patent No.: US 11,506,791 B2
(45) Date of Patent: Nov. 22, 2022

(54) SENSOR CALIBRATION (71) Applicant: Continental Automotive Systems, Inc., Auburn Hills, MI (US)

(72) Inventors: Aaron Simon, Santa Barbara, CA (US); Kevin Mohr, Santa Barbara, CA (US)

(73) Assignee: Continental Autonomous Mobility US, LLC, Auburn Hills, MI (US)

( * ) Notice: Subject to any disclaimer, the term of this patent is extended or adjusted under 35 U.S.C. 154(b) by 442 days.

(21) Appl. No.: 16/809,523

(22) Filed: Mar. 4, 2020

(65) Prior Publication Data

US 2021/0278543 A1 Sep. 9, 2021

(51) Int. Cl.
*G01S 17/931* (2020.01)
*G01S 17/894* (2020.01)
*G01S 17/06* (2006.01)
*G01S 7/481* (2006.01)

(52) U.S. Cl.
CPC ............ *G01S 17/931* (2020.01); *G01S 17/06* (2013.01); *G01S 17/894* (2020.01); *G01S 7/4813* (2013.01)

(58) Field of Classification Search
CPC ...... G01S 17/931; G01S 17/894; G01S 17/06; G01S 7/4813
USPC ...................................................... 356/5.01
See application file for complete search history.

(56) References Cited

U.S. PATENT DOCUMENTS

| | | | | |
|---|---|---|---|---|
| 5,677,760 A * | 10/1997 | Mikami | ................... | G02B 7/32 356/3.07 |
| 6,341,012 B1 * | 1/2002 | Yoshida | ................... | G01C 3/08 356/3.04 |
| 8,081,298 B1 * | 12/2011 | Cross | ................... | F41G 3/02 356/3.01 |
| 9,866,819 B2 * | 1/2018 | Suzuki | ................. | H04N 13/246 |
| 10,578,719 B2 * | 3/2020 | O'Keeffe | ................. | G01S 17/42 |
| 2016/0331470 A1 * | 11/2016 | Sato | ........................ | A61M 1/84 |
| 2019/0004147 A1 | 1/2019 | Conrad et al. | | |

(Continued)

FOREIGN PATENT DOCUMENTS

| | | |
|---|---|---|
| DE | 102009009046 A1 | 10/2009 |
| GN | 108562881 A | 9/2018 |
| WO | 2018067354 A1 | 4/2018 |

OTHER PUBLICATIONS

International Search Report and the Written Opinion of the International Searching Authority dated Jun. 23, 2021 for the counterpart PCT Application No. PCT/US2021/070233.

(Continued)

*Primary Examiner* — Gertrude Arthur Jeanglaude (57) ABSTRACT

A method includes providing a fixture including a target in a field of view of a sensor mounted to a vehicle. The target is detectable by the sensor. The fixture includes a first rangefinding device and a second rangefinding device spaced from the first rangefinding device. The method includes measuring a first angle and first distance from the first rangefinding device to a first known point on the vehicle; measuring a second angle and second distance from the second rangefinding device to a second known point on the vehicle; determining a position and orientation of the target in a coordinate system relative to the vehicle based on the first angle, the first distance, the second angle, and the second distance; and calibrating the sensor based on the position and orientation of the target.

15 Claims, 9 Drawing Sheets

(56) References Cited

U.S. PATENT DOCUMENTS

2019/0072653 A1* 3/2019 Dunne ................ G01S 7/4808

OTHER PUBLICATIONS

TEXA S.p.A.; ADAS; https://www.texa.com/Upload/Depliant/pieghevole-adas-en-gb-v12.pdf; Jul. 2019.

* cited by examiner

SENSOR CALIBRATION

BACKGROUND

Modern vehicles often include sensors. Some sensors detect the external world, e.g., objects and/or characteristics of surroundings of the vehicle, such as other vehicles, road lane markings, traffic lights and/or signs, pedestrians, etc. Examples of such sensors include radar sensors, scanning laser range finders, light detection and ranging (LIDAR) devices, and image processing sensors such as cameras. The sensors can be factory-installed or can be acquired and mounted to a vehicle in the aftermarket.

Calibration is an important process for ensuring that data from a sensor is properly interpreted by computers of the vehicle. Calibration can be intrinsic or extrinsic. Intrinsic calibration is determining the relative position and orientation between the sensing components and a housing of the sensor. Extrinsic calibration is determining the relative position and orientation between the housing of the sensor and an object external to the sensor, typically the vehicle.

DETAILED DESCRIPTION

With reference to the Figures, wherein like numerals identify like parts throughout the several views, a method includes providing a fixture 30 including a target 32 in a field of view of a sensor 34 mounted to a vehicle 36. The target 32 is detectable by the sensor 34. The fixture 30 includes a first rangefinding device 38 and a second rangefinding device 40 spaced from the first rangefinding device 38. The method includes measuring a first angle $\alpha_1$ and first distance $d_1$ from the first rangefinding device 38 to a first known point 42 on the vehicle 36; measuring a second angle $\alpha_2$ and second distance $d_2$ from the second rangefinding device 40 to a second known point 44 on the vehicle 36; determining a position $(x, y, z)_v$ and orientation $(\varphi, \theta, \psi)_v$ of the target 32 in a coordinate system relative to the vehicle 36 based on the first angle $\alpha_1$, the first distance $d_1$, the second angle $\alpha_2$, and the second distance $d_2$; and calibrating the sensor 34 based on the position $(x, y, z)_v$ and orientation $(\varphi, \theta, \psi)_v$ of the target 32.

For the purposes of this disclosure, a "known point" means a point on the vehicle 36 for which a position $(x, y, z)_v$ in a coordinate system of the vehicle 36 is known. Specifically, the "known point" is a point on the vehicle 36 for which a computer 48 of the vehicle 36 knows the position $(x, y, z)_v$ in a coordinate system of the vehicle 36 that is stored in the computer 48. The subscript "v" and the phrase "relative to the vehicle" refer to a coordinate system having an origin fixed with respect to the vehicle 36. The subscript "s" and the phrase "relative to the sensor" refer to a coordinate system having an origin fixed with respect to the sensor 34. The values x and y refer to orthogonal horizontal spatial coordinates, and the value z refers to a vertical spatial coordinate. The values $\varphi$, $\theta$, $\psi$ refer to yaw, pitch, and roll, respectively. The position (x, y, z) of the target 32 is measured with respect to a predefined point P on the target 32. For example, the predefined point P can be a midpoint between the rangefinding devices 38, 40.

Measuring the known points 42, 44 on the vehicle 36 from the fixture 30 permits the fixture 30 to be separate from the vehicle 36. This separation means the fixture 30 is mobile and allows placement of the fixture 30 at an arbitrary position $(x, y, z)_v$ and orientation $(\varphi, \theta, \psi)_v$ around the vehicle 36 for calibration of the sensor 34. The separation also reduces the footprint needed for the calibration compared with dedicated facilities for vehicle sensor calibration, which require locking the vehicle 36 into place relative to the target 32. A facility 46 for calibration using the fixture 30 according to the method can be used for other purposes in addition to calibration, simply by moving the fixture 30 out of the way. The reduced footprint makes the method useful for aftermarket sensors and for repairing sensors because the calibration can be done more easily outside a factory environment.

Figure 1:
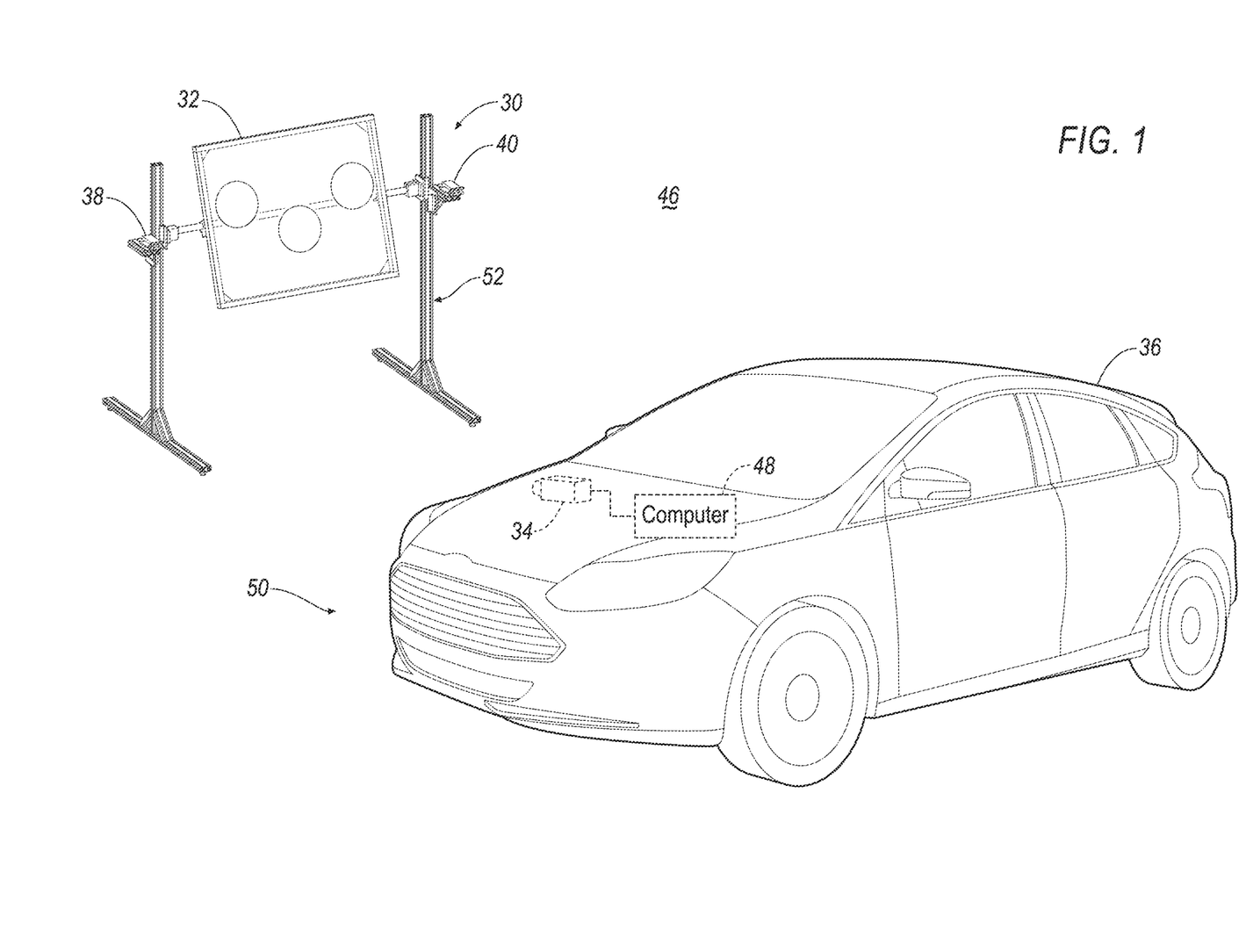
FIG. 1 is a perspective view of a vehicle with a sensor and a fixture for calibrating the sensor.

With reference to FIG. 1, the vehicle 36 may be any passenger or commercial automobile such as a car, a truck, a sport utility vehicle, a crossover, a van, a minivan, a taxi, a bus, etc. As other examples, the vehicle 36 may be of any suitable manned or unmanned type including a plane, satellite, drone, watercraft, etc.

The sensor 34 detects the external world, e.g., objects and/or characteristics of surroundings of the vehicle 36, such as other vehicles, road lane markings, traffic lights and/or signs, pedestrians, etc. For example, the sensor 34 can be a light detection and ranging device (LIDAR) sensor, a radar sensor, a scanning laser range finder, or an image processing sensor such as a camera. For example, as a LIDAR sensor, the sensor 34 detects distances to objects by emitting laser pulses at a particular wavelength and measuring the time of flight for the pulse to travel to the object and back. As another example, as a camera, the sensor 34 can detect electromagnetic radiation in some range of wavelengths. For example, the sensor 34 may detect visible light, infrared radiation, ultraviolet light, or some range of wavelengths including visible, infrared, and/or ultraviolet light. For another example, the sensor 34 may be a time-of-flight (TOF) camera, which include a modulated light source for illuminating the environment and detect both reflected light from the modulated light source and ambient light to sense reflectivity amplitudes and distances to the scene.

The sensor 34 may be fixed relative to the vehicle 36, i.e., aimed in a fixed direction to have a single, fixed field of view relative to the vehicle. In the example in which the sensor 34 is a LIDAR sensor, the LIDAR sensor may be a solid-state LIDAR sensor. In such an example, the LIDAR sensor is stationary relative to the vehicle 36. For example, the LIDAR sensor may include a casing that is fixed relative to the vehicle 36, i.e., does not move relative to the component of the vehicle 36 to which the casing is attached. The casing supports and encloses some or all components of a light-transmission system and the light-receiving system of the LIDAR sensor, and the light-transmission system and the light-receiving system are aimed in one field of illumination/ field of view during operation. As a solid-state LIDAR sensor, the LIDAR sensor may be a flash LIDAR sensor. In such an example, the LIDAR sensor emits pulses, i.e., flashes, of light into a field of illumination. More specifically, the LIDAR sensor may be a 3D flash LIDAR system that generates a 3D environmental map of the surrounding environment.

The sensor 34 is fixedly mounted to the vehicle 36. For example, the sensor 34 can be mounted on a body panel such as a fender, a quarter panel, a roof, etc., of the vehicle 36. The sensor 34 can be attached to the vehicle 36 in any suitable manner that prevents movement of the sensor 34 relative to the vehicle 36, e.g., bolts, adhesive, clips, clamps, etc.

The sensor 34 is operated to detect objects in the environment surrounding the vehicle 36 and to detect distance, i.e., range, of those objects for environmental mapping. The output of the sensor 34 may be used, for example, to autonomously or semi-autonomously control operation of the vehicle 36, e.g., propulsion, braking, steering, etc. Specifically, the sensor 34 may be a component of or in communication with an advanced driver-assistance system (ADAS) of the vehicle 36. The sensor 34 may be mounted on the vehicle 36 in any suitable position and aimed in any suitable direction. As one example, the sensor 34 in FIG. 1 is shown on a side of the vehicle 36 and directed to the side.

As set forth above, the vehicle 32 includes the computer 48. The computer 48 is in communication with the sensor 34. The computer 48 is a microprocessor-based computing device, e.g., an electronic controller or the like. The computer 48 can include a processor, a memory, etc. The memory of the computer 48 includes media for storing instructions executable by the processor as well as for electronically storing data and/or databases. For example, the computer 48 can be an electronic control module (ECM) built into a housing of the sensor 34. The computer 48 may transmit and receive data through a communications network such as a controller area network (CAN) bus, Ethernet, WiFi, Local Interconnect Network (LIN), onboard diagnostics connector (OBD-II), and/or by any other wired or wireless communications network. The computer 48 stores a coordinate system of the vehicle 36 and the position (x, y, z)$_v$ of known points of the vehicle 36, including the known points 42, 44, in the coordinate system of the vehicle 36.

The facility 46 for calibrating the sensor 34 can be any location with a flat floor 50 large enough to contain the vehicle 36 and the fixture 30 placed at a proper distance for calibration. The vehicle 36 and the fixture 30 sit on the floor 50 of the facility 46. The vehicle 36 and the fixture 30 can be unattached to the facility 46, and the fixture 30 is not attached to the vehicle 36.

Figure 2:
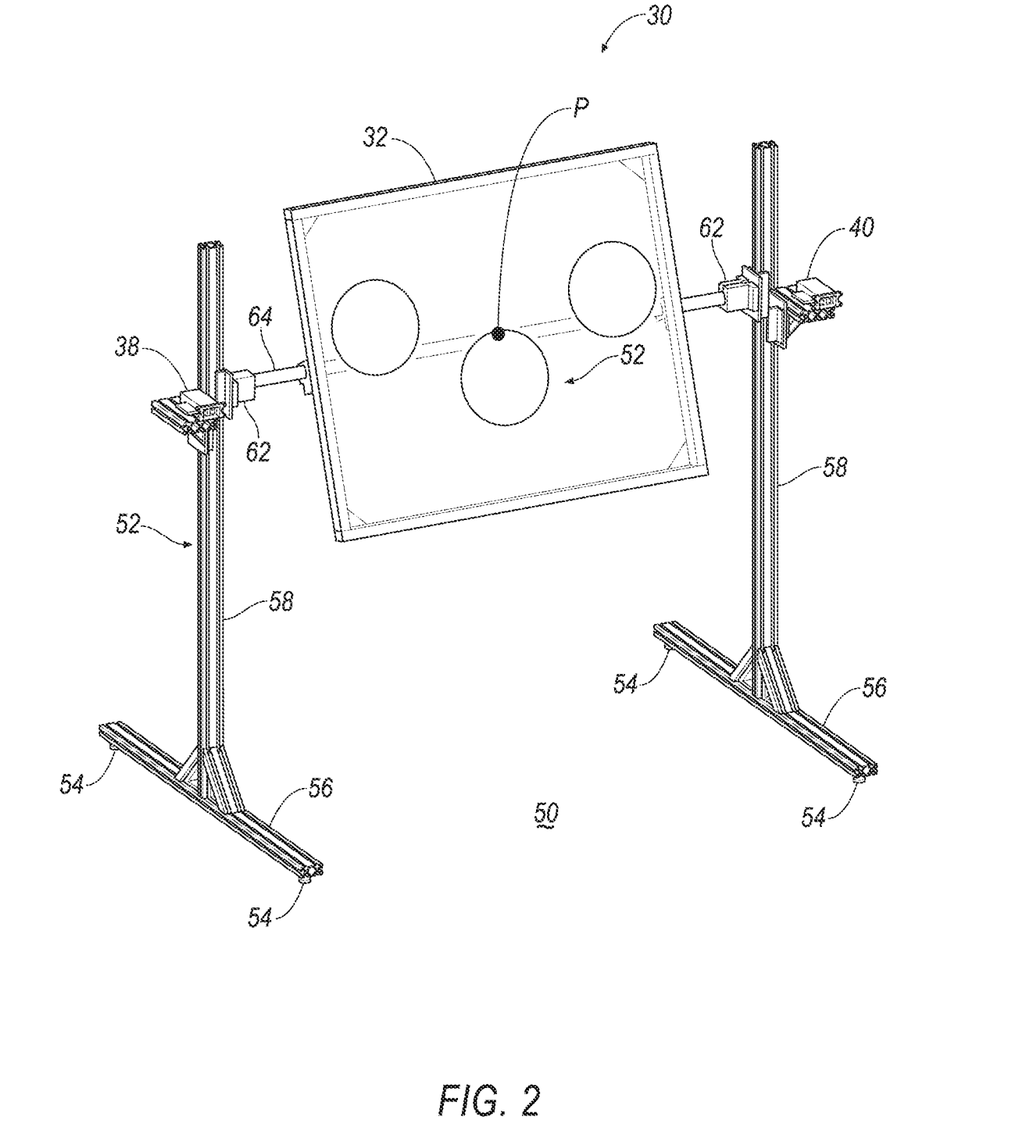
FIG. 2 is a perspective view of the fixture.

With reference to FIG. 2, the fixture 30 includes a frame 52, the target 32 attached to the frame 52, feet 54 attached to the frame 52, the first rangefinding device 38 attached to the frame 52, and the second rangefinding device 40 attached to the frame 52.

The frame 52 can include a plurality of beams 56, 58 rigidly attached to each other. The beams 56, 58 are arranged to provide a stable base for the fixture 30 and to provide mounting locations for the target 32 and the rangefinding devices 38, 40. For example, the beams 56, 58 can include horizontal beams 56 at a bottom of the fixture 30 forming a base and two vertical beams 58. The rangefinding devices 38, 40 can be mounted to the respective vertical beams 58, the verticality of which permits height adjustment of the rangefinding devices 38, 40. The target 32 can be mounted to the vertical beams 58 between the vertical beams 58.

Figure 3:
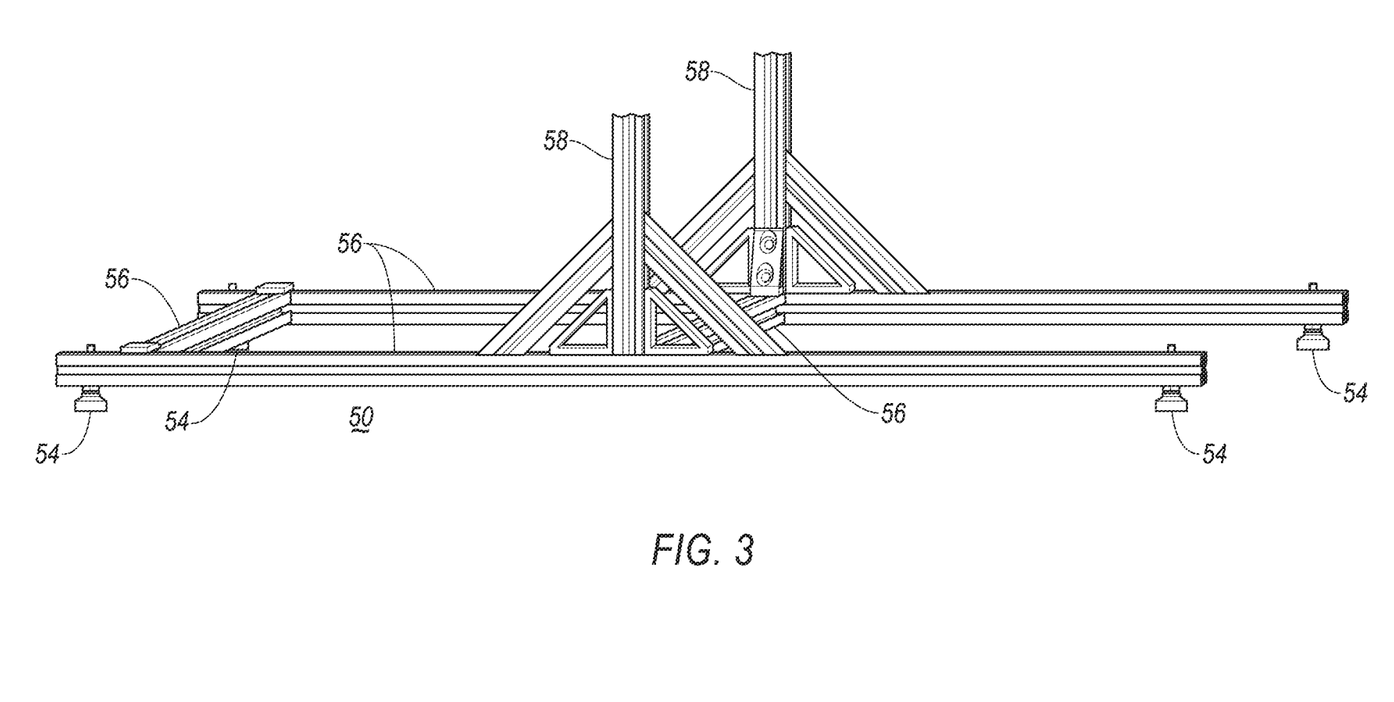
FIG. 3 is a perspective view of a bottom of the fixture.

With reference to FIG. 3, the feet 54 are attached to the frame 52 on downward faces of the horizontal beams 56. The frame 52 rests on the feet 54, which rest on the floor 50 of the facility 46. The feet 54 can be rubber or a similarly nonslipping material. The feet 54 are not attached to the floor 50. The feet 54 can be adjustable in a vertical direction relative to the horizontal beams 56, e.g., by being attached to the horizontal beams 56 via a threaded rod threadedly engaged with the horizontal beams 56. The feet 54 can be adjusted so that the fixture 30 is stable on the floor 50. The feet 54 include at least three feet 54, e.g., four feet 54.

Returning to FIG. 2, the target 32 is detectable by the sensor 34. The sensor 34 can be any suitable shape and appearance permitting the sensor 34 to detect a position (x, y, z)$_s$ and orientation ($\varphi$, $\theta$, $\psi$)$_s$ of the target 32 relative to the sensor 34. For example, as shown in the Figures, the target 32 is a flat panel having a pattern of reflective markings.

Figure 4:
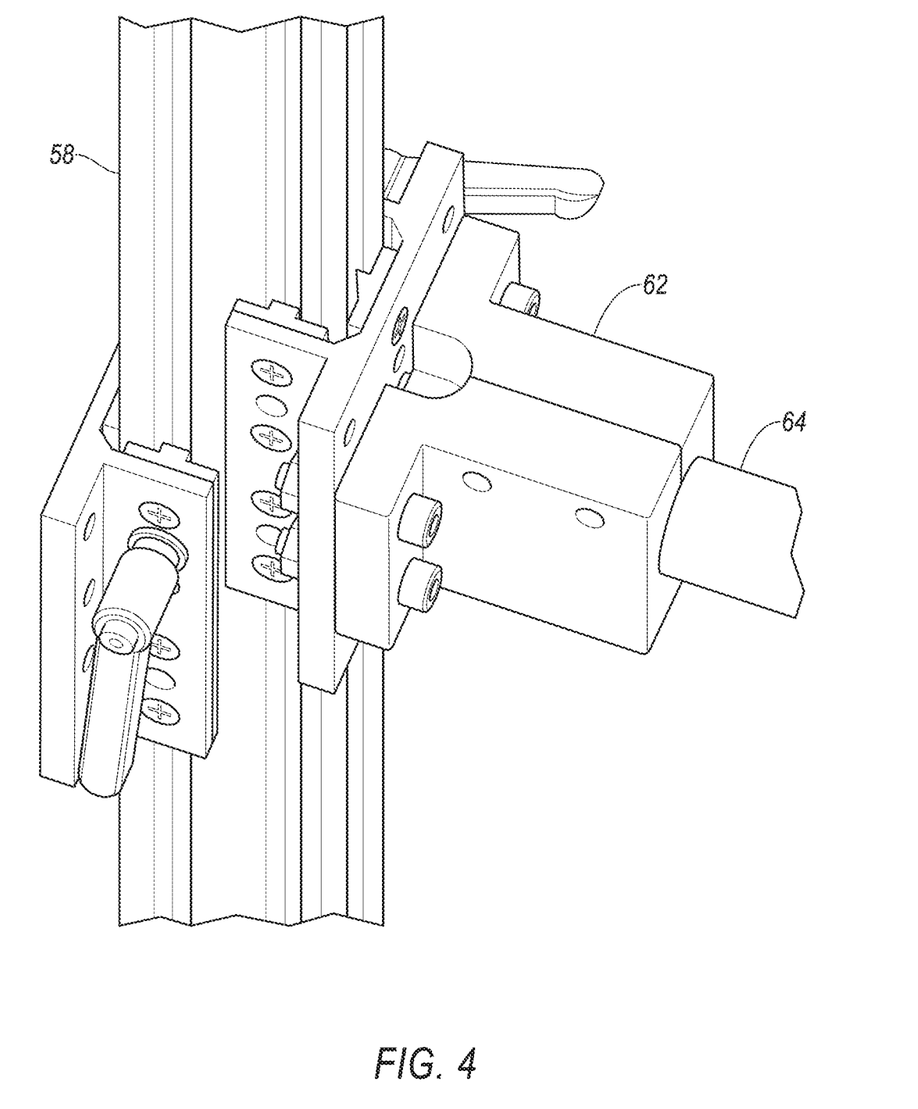
FIG. 4 is a perspective view of an attachment of a target to a frame of the fixture.
Figure 5:
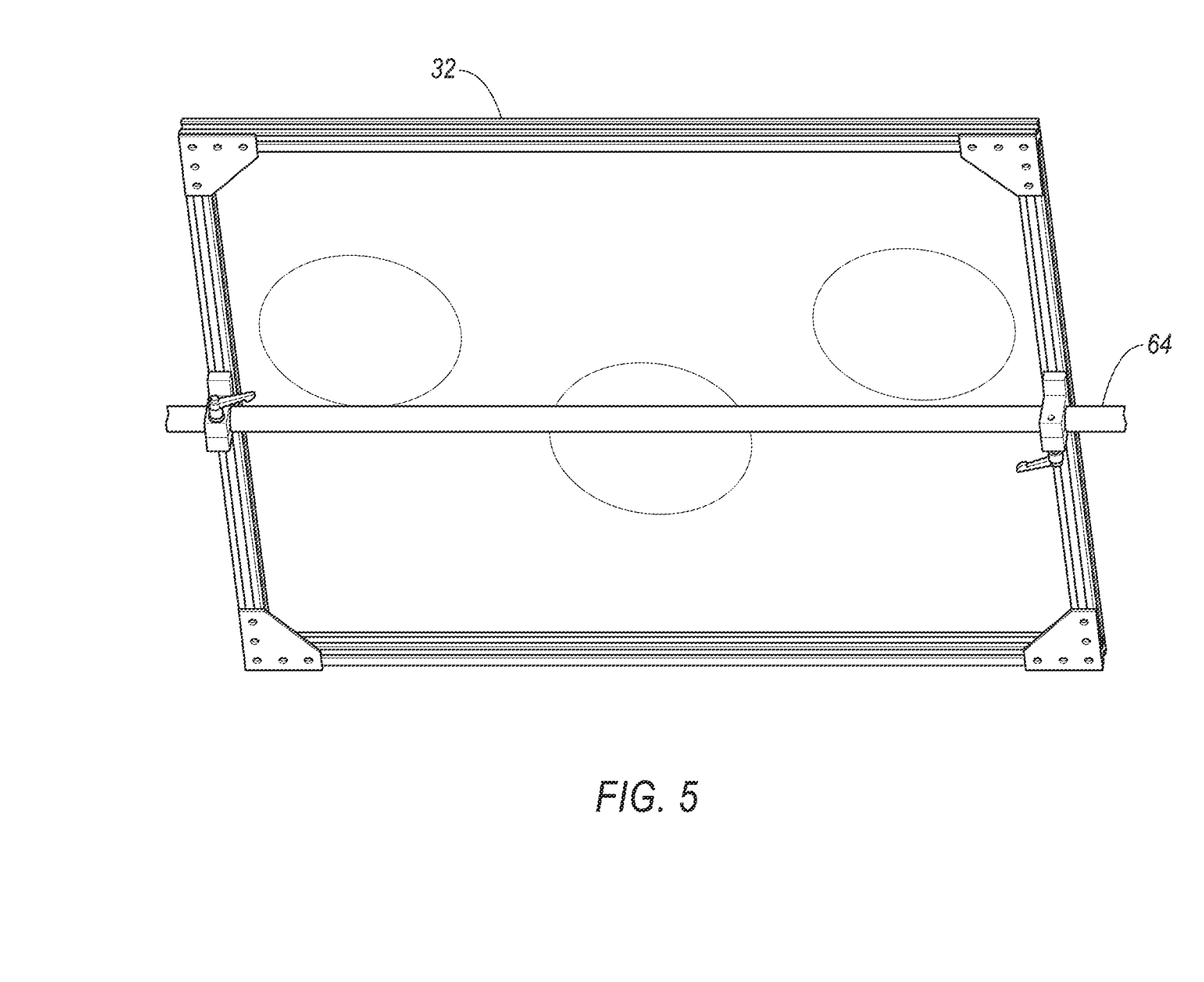
FIG. 5 is a rear view of the target.

With reference to FIGS. 4 and 5, the target 32 is movable relative to the frame 52 of the fixture 30. In particular, the target 32 can be slidable vertically along the vertical beams 58 and rotatable relative to the frame 52 about a horizontal axis of rotation. In other words, the vertical position z$_v$ and the pitch $\theta_v$ of the target 32 are adjustable. For example, the fixture 30 can include two target mounts 62 slidably coupled to the respective vertical beams 58 and a target pole 64 fixed to the target mounts 62 and elongated from one to the other of the target mounts 62. The target 32 can be rotatably coupled to the target pole 64. The target 32 can rotate relative to the frame 52 about a horizontal axis of rotation defined by the target pole, and the target 32 can slide vertically by sliding the target mounts 62.

Figure 6:
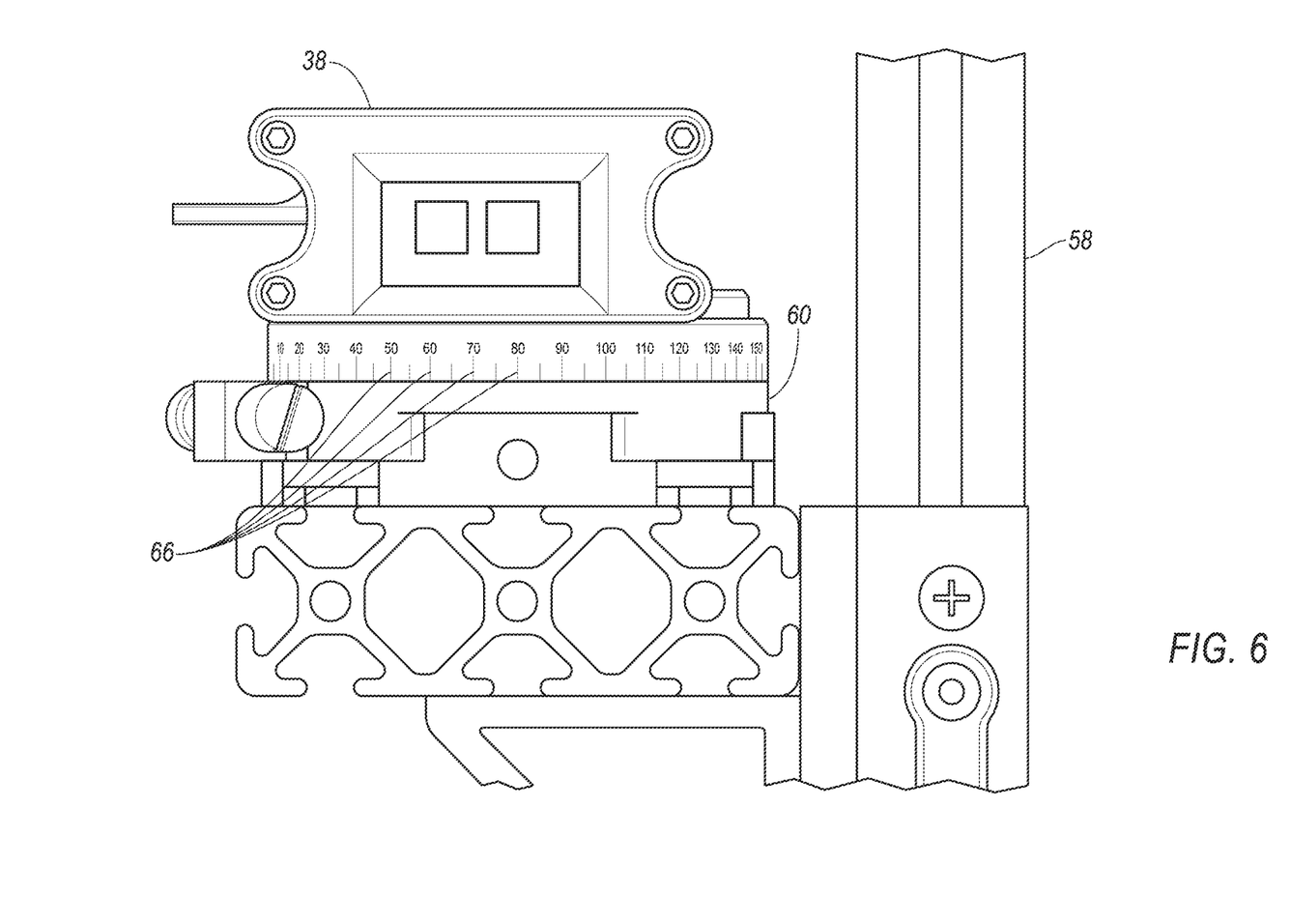
FIG. 6 is a front view of a rangefinding device of the fixture.
Figure 7:
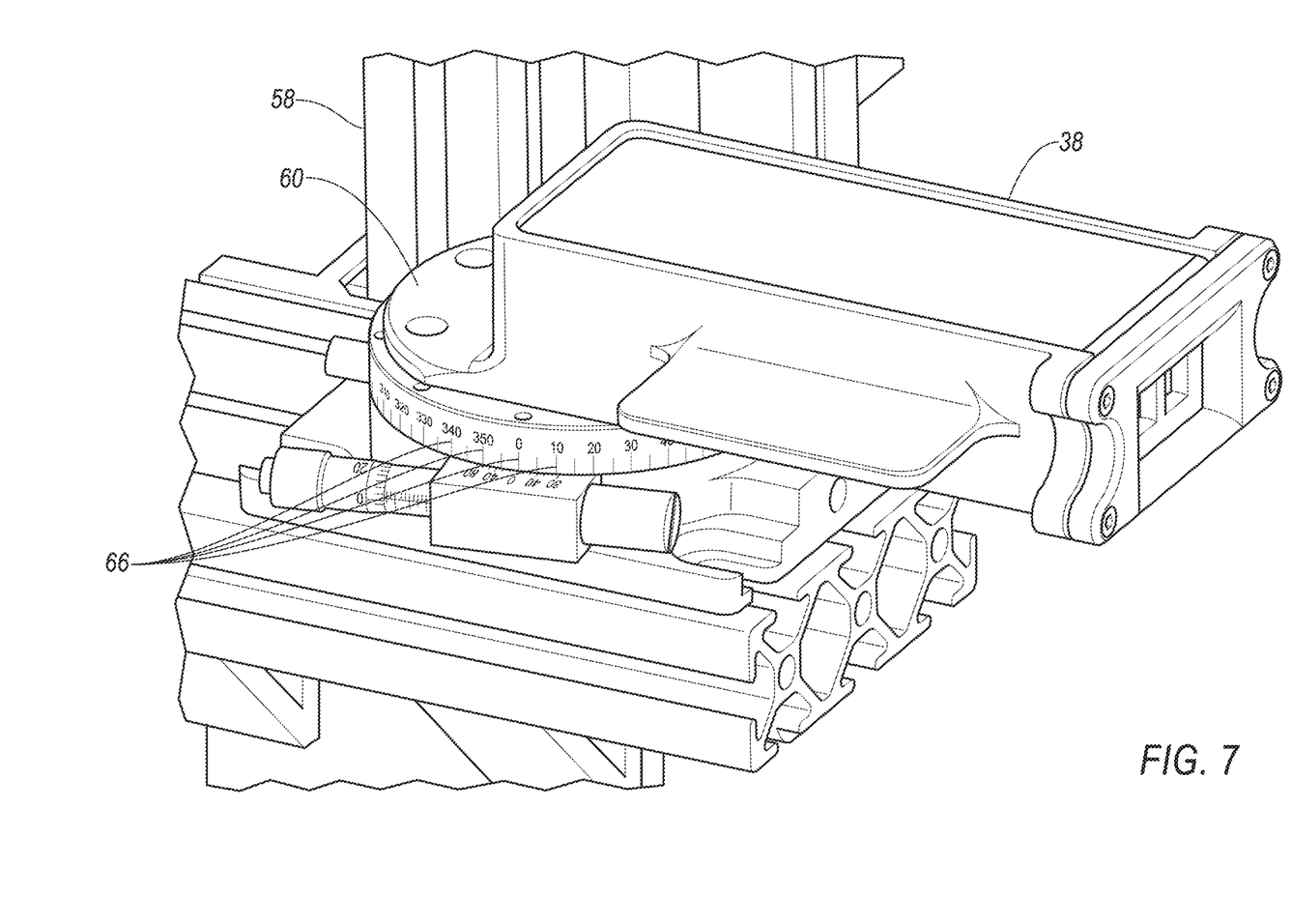
FIG. 7 is a perspective view of the rangefinding device.

With reference to FIGS. 6 and 7, the rangefinding devices 38, 40 are any suitable device for active rangefinding that outputs a distance. For example, the rangefinding devices 38, 40 can be laser rangefinders. Alternatively, the rangefinding devices 38, 40 can be LIDAR, radar, sonar, ultrasonic, etc.

The rangefinding devices 38, 40 are mounted to the frame 52, specifically to respective rangefinder bases 60 attached to the respective vertical beams 58. The rangefinding devices 38, 40 are spaced from each other. Specifically, the rangefinding devices 38, 40 are horizontally spaced from each other. The rangefinding devices 38, 40, specifically the rangefinder bases 60 to which the rangefinding devices 38, 40 are mounted, are each slidable along a respective one of the vertical beams 58. The rangefinder bases 60 are slidably coupled to the vertical beams 58. The rangefinding devices 38, 40 are each rotatable about a respective vertical axis relative to the frame 52 on the respective rangefinder bases 60. The rangefinder bases 60 include markings 66 indicating an angle $\alpha$ of the respective rangefinding device relative to the frame 52.

Figure 8:
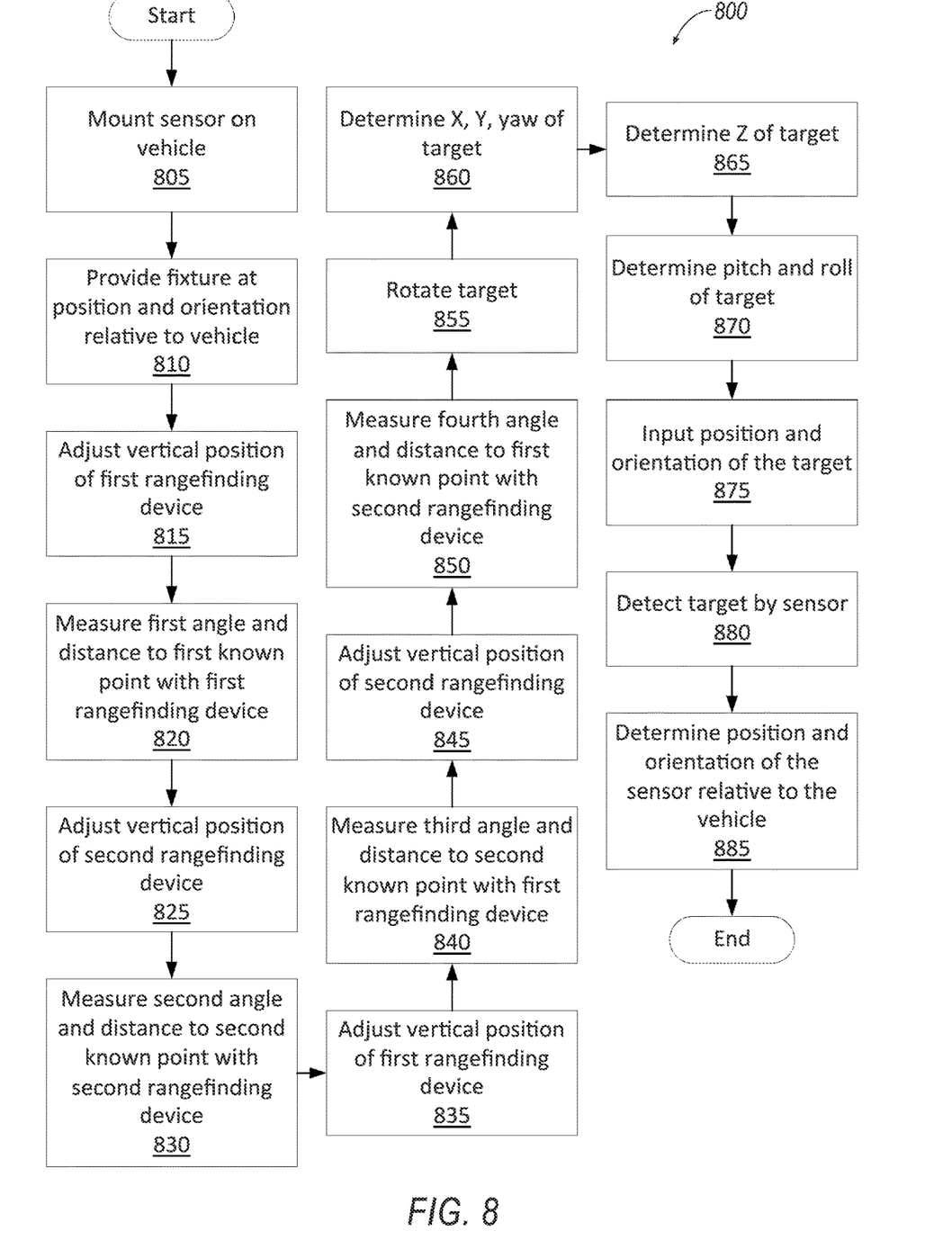
FIG. 8 is a process flow diagram of an example process for calibrating the sensor using the fixture.
Figure 9A:
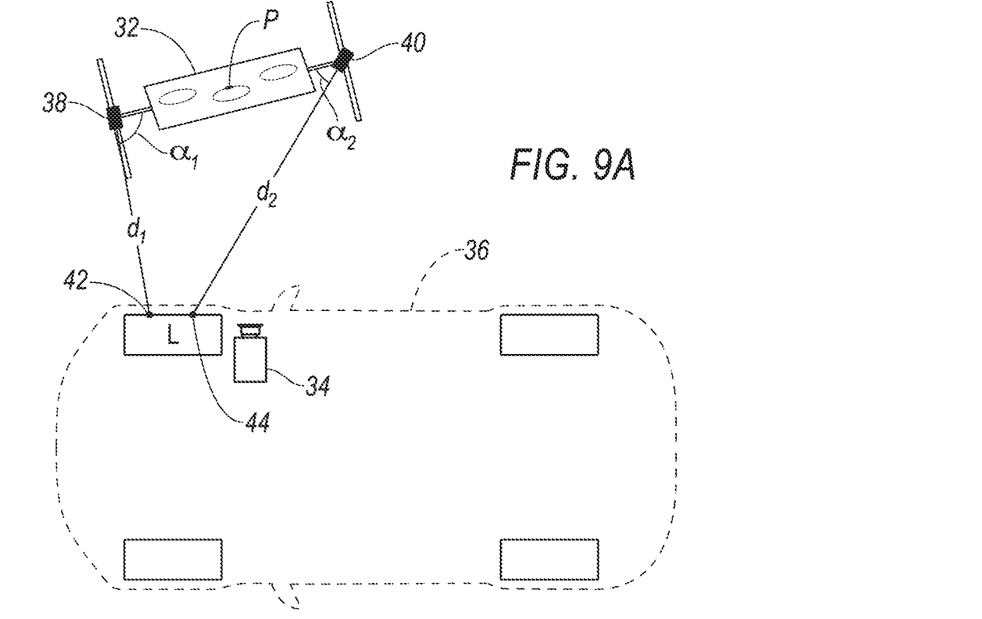
FIG. 9A is a top diagrammatic view of the vehicle and the fixture.
Figure 9B:
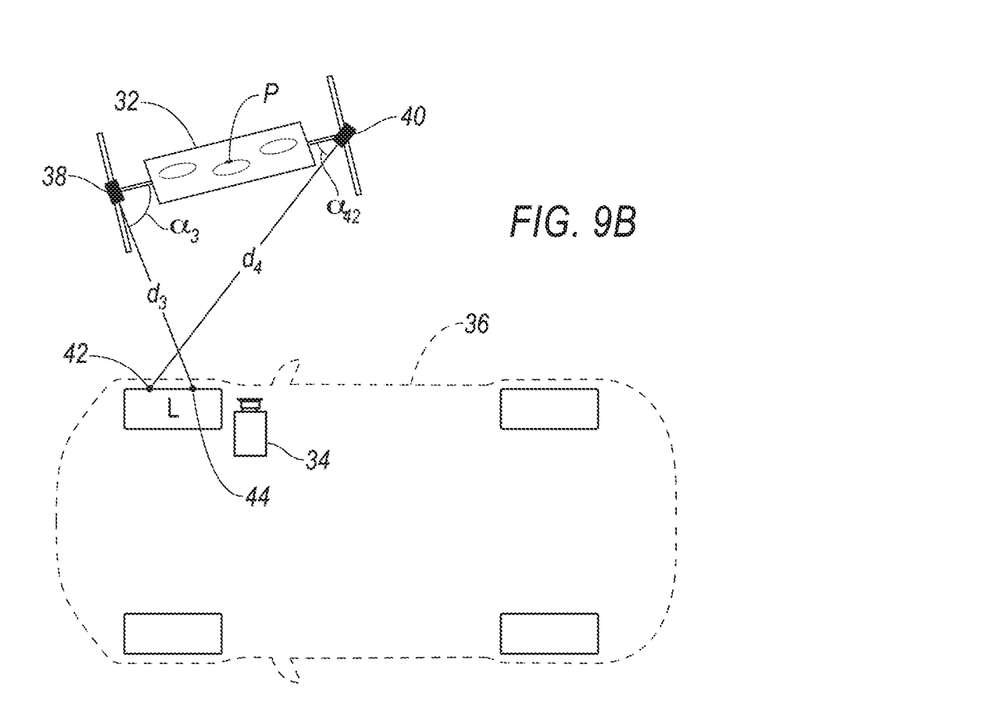
FIG. 9B is a top diagrammatic view of the vehicle and the fixture.

FIG. 8 is a process flow diagram illustrating an exemplary process 800 for calibrating the sensor 34 using the fixture 30. As a general overview of the process 800, a technician provides the fixture 30 at a position (x, y, z)$_v$ and orientation ($\varphi$, $\theta$, $\psi$)$_v$ in the field of view of the sensor 34; positions the first rangefinding device 38 and measures the first angle $\alpha_1$ and first distance d$_1$ to the first known point 42; positions the second rangefinding device 40 and measures the second angle $\alpha_2$ and second distance d$_2$ to the second known point 44; positions the first rangefinding device 38 and measures a third angle $\alpha_3$ and third distance d$_3$ to the second known point 44; positions the second rangefinding device 40 and measures a fourth angle $\alpha_4$ and fourth distance d$_4$ to the first known point 42; determines the horizontal position x$_v$, y$_v$ and yaw $\varphi_v$ of the position (x, y, z)$_v$ and orientation ($\varphi$, $\theta$, $\psi$)$_v$ of the target 32 from the angles $\alpha_1$, $\alpha_2$, $\alpha_3$, $\alpha_4$ and distances $d_1$, $d_2$, $d_3$, $d_4$; measures the vertical position $z_v$, pitch $\theta_v$, and roll $\psi_v$ of the position $(x, y, z)_v$ and orientation $(\varphi, \theta, \psi)_v$ of the target 32 relative to the floor 50; and calibrates the sensor 34 by inputting the position $(x, y, z)_v$ and orientation $(\varphi, \theta, \psi)_v$ of the target 32 relative to the vehicle 36, using the sensor 34 to measure the position $(x, y, z)_s$ and orientation $(\varphi, \theta, \psi)_s$ of the target 32 relative to the sensor 34, and determining the position $(x, y, z)_v$ and orientation $(\varphi, \theta, \psi)_v$ of the sensor 34 relative to the vehicle 36. The known points 42, 44 of the coordinate system of the vehicle 36 may be points on the external surface of a body panel and/or frame of the vehicle 36. For example, as shown in FIGS. 9A-B, the known points 42, 44 are the forwardmost and rearwardmost points on a right front wheel of the vehicle 36.

The process 800 begins in a block 805, in which the sensor 34 is mounted on the vehicle 36, as described above. The sensor 34 thus has a fixed position $(x, y, z)_v$ and orientation $(\varphi, \theta, \psi)_v$ relative to the vehicle 36, but the position $(x, y, z)_v$ and orientation $(\varphi, \theta, \psi)_v$ are not known with certainty.

Next, in a block 810, a technician provides the fixture 30 in the facility 46. The technician places the fixture 30 at a horizontal position $x_v$, $y_v$ and horizontal orientation (i.e., yaw) $\varphi_v$, at which the fixture 30 will remain for the rest of the process 800. The horizontal position and orientation are chosen by the technician so that the target 32 is in the field of view of the sensor 34.

Next, in a block 815, before measuring the first angle $\alpha_1$ and first distance $d_1$ from the first rangefinding device 38 to the first known point 42, the technician adjusts a vertical position of the first rangefinding device 38 relative to the frame 52, e.g., by sliding along the respective vertical beam 58, so that the vertical position of the first rangefinding device 38 is approximately the same as the vertical position of the first known point 42. The vertical adjustment means that the first rangefinding device 38 does not need to be tilted, and thus the distance $d_1$ does not need to be converted to a horizontal projection of the distance. The technician also adjusts a direction along which the first rangefinding device 38 points so that the first rangefinding device 38 points straight at the first known point 42.

Next, in a block 820, the technician measures the first angle $\alpha_1$ and first distance $d_1$ from the first rangefinding device 38 to the first known point 42 on the vehicle 36. As shown in FIG. 9A, the first angle $\alpha_1$ is a horizontal angle between a line from the first rangefinding device 38 to the first known point 42 and a line from the first rangefinding device 38 to the predefined point P, in which the lines are projected to a horizontal plane. The first angle $\alpha_1$ is read from the markings 66 on the respective rangefinder base 60. The first distance $d_1$ is a horizontal distance from the first rangefinding device 38 to the first known point 42. The first distance $d_1$ is an output of the first rangefinding device 38.

Next, in a block 825, before measuring the second angle $\alpha_2$ and second distance $d_2$ from the second rangefinding device 40 to the second known point 44, the technician adjusts a vertical position of the second rangefinding device 40 relative to the frame 52, e.g., by sliding along the respective vertical beam 58, so that the vertical position of the second rangefinding device 40 is approximately the same as the vertical position of the second known point 44. The technician also adjusts a direction along which the second rangefinding device 40 points so that the second rangefinding device 40 points straight at the second known point 44.

Next, in a block 830, the technician measures the second angle $\alpha_2$ and second distance $d_2$ from the second rangefinding device 40 to the second known point 44 on the vehicle 36. As shown in FIG. 9A, the second angle $\alpha_2$ is a horizontal angle between a line from the second rangefinding device 40 to the second known point 44 and a line from the second rangefinding device 40 to the predefined point P, in which the lines are projected to a horizontal plane. The second angle $\alpha_2$ is read from the markings 66 on the respective rangefinder base 60. The second distance $d_2$ is a horizontal distance from the second rangefinding device 40 to the second known point 44. The second distance $d_2$ is an output of the second rangefinding device 40.

Next, in a block 835, before measuring the third angle $\alpha_3$ and third distance $d_3$ from the first rangefinding device 38 to the second known point 44, the technician adjusts a vertical position of the first rangefinding device 38 relative to the frame 52, e.g., by sliding along the respective vertical beam 58, so that the vertical position of the first rangefinding device 38 is approximately the same as the vertical position of the second known point 44. The technician also adjusts a direction along which the first rangefinding device 38 points so that the first rangefinding device 38 points straight at the second known point 44.

Next, in a block 840, the technician measures the third angle $\alpha_3$ and third distance $d_3$ from the first rangefinding device 38 to the second known point 44 on the vehicle 36. As shown in FIG. 9B, the third angle $\alpha_3$ is a horizontal angle between a line from the first rangefinding device 38 to the second known point 44 and a line from the first rangefinding device 38 to the predefined point P, in which the lines are projected to a horizontal plane. The third angle $\alpha_3$ is read from the markings 66 on the respective rangefinder base 60. The third distance $d_3$ is a horizontal distance from the first rangefinding device 38 to the second known point 44. The third distance $d_3$ is an output of the first rangefinding device 38.

Next, in a block 845, before measuring the fourth angle $\alpha_4$ and fourth distance $d_4$ from the second rangefinding device 40 to the first known point 42, the technician adjusts a vertical position of the second rangefinding device 40 relative to the frame 52, e.g., by sliding along the respective vertical beam 58, so that the vertical position of the second rangefinding device 40 is approximately the same as the vertical position of the first known point 42. The technician also adjusts a direction along which the second rangefinding device 40 points so that the second rangefinding device 40 points straight at the first known point 42.

Next, in a block 850, the technician measures the fourth angle $\alpha_4$ and fourth distance $d_4$ from the second rangefinding device 40 to the first known point 42 on the vehicle 36. As shown in FIG. 9B, the fourth angle $\alpha_4$ is a horizontal angle between a line from the second rangefinding device 40 to the first known point 42 and a line from the second rangefinding device 40 to the predefined point P, in which the lines are projected to a horizontal plane. The fourth angle $\alpha_4$ is read from the markings 66 on the respective rangefinder base 60. The fourth distance $d_4$ is a horizontal distance from the second rangefinding device 40 to the first known point 42. The fourth distance $d_4$ is an output of the second rangefinding device 40.

Next, in a block 855, the technician rotates the target 32 relative to the frame 52 to a pitch $\theta_v$ that avoids a specular reflection from the sensor 34. For example, if the sensor 34 is a LIDAR, the pitch $\theta_v$ is chosen so that the laser from the LIDAR does not reflect directly into the detector of the LIDAR. For another example, if the sensor 34 is a camera, the pitch $\theta_v$ is chosen so that no lights in the facility 46 reflect directly into the camera.

As an overview of blocks 860-870, the technician determines the position $(x, y, z)_v$ and orientation $(\varphi, \theta, \psi)_v$ of the target 32 based on the angles $\alpha_1, \alpha_2, \alpha_3, \alpha_4$ and distances $d_1, d_2, d_3, d_4$ and based on taking measurements of the target 32 relative to the floor 50. Specifically, the technician determines the horizontal position $x_v$, $y_v$, and yaw $\varphi_v$ of the target 32 based on the angles $\alpha_1, \alpha_2, \alpha_3, \alpha_4$ and distances $d_1, d_2, d_3, d_4$. The technician measures the vertical position $z_v$, pitch $\theta_v$, and roll $\psi_v$ of the target 32 relative to the floor 50 because the vertical position $z_v$, pitch $\theta_v$, and roll $\psi_v$ relative to the floor 50 are convertible to the vertical position $z_v$, pitch $\theta_v$, and roll $\psi_v$ relative to the vehicle 36 regardless of the position of the vehicle 36 on the floor 50.

In the block 860, the technician determines the horizontal position $x_v$, $y_v$, and yaw $\varphi_v$ of the position $(x, y, z)_v$ and orientation $(\varphi, \theta, \psi)_v$ of the target 32 based on the angles $\alpha_1, \alpha_2, \alpha_3, \alpha_4$ and distances $d_1, d_2, d_3, d_4$. The following equations describe the horizontal positions of the rangefinding devices 38, 40, using the first known point 42 as the origin of the coordinate system:

$$x_{v1} = d_1 \cos\left(180 - \frac{d_3(\alpha_1 - \alpha_3)}{L}\right)$$

$$y_{v1} = d_1 \sin\left(180 - \frac{d_3(\alpha_1 - \alpha_3)}{L}\right)$$

$$x_{v2} = d_2 \cos\left(180 - \frac{d_4(\alpha_2 - \alpha_4)}{L}\right)$$

$$y_{v2} = d_2 \sin\left(180 - \frac{d_4(\alpha_2 - \alpha_4)}{L}\right)$$

in which $(x_{v1}, y_{v1})$ is the horizontal position of the first rangefinding device 38, $(x_{v2}, y_{v2})$ is the horizontal position of the second rangefinding device 40, and L is the horizontal distance between the first known point 42 and the second known point 44. The horizontal position $(x_v, y_v)$ can be set as the midpoint between the rangefinding devices 38, 40, $$\left(\frac{x_{v2} + x_{v1}}{2}, \frac{y_{v2} + y_{v1}}{2}\right),$$

which is also the predefined point P. If the first known point 42 is not the origin of the coordinate system of the vehicle 36, then the position $(x_v, y_v)$ can be transformed by subtracting the horizontal position $(\Delta x, \Delta y)$ of the first known point 42 relative to the origin. The following equation describes the horizontal orientation (i.e., yaw) relative to a horizontal line normal to a line between the first and second known points 42, 44:

$$\varphi_v = 90 - \tan\left(\frac{y_{v2} - y_{v1}}{x_{v2} - x_{v1}}\right)$$

Next, in a block 865, the technician measures the vertical position $z_v$ of the target 32 relative to the vehicle 36 by measuring the vertical distance from the floor 50. If the floor 50 is not the origin of the coordinate system of the vehicle 36, then the measured vertical distance can be transformed by subtracting the vertical position $\Delta z$ of the floor 50 relative to the origin.

Next, in a block 870, the technician measures the pitch $\theta_v$ and roll $\psi_v$ of the target 32 relative to the vehicle 36. The pitch $\theta_v$ is the rotation to which the target 32 was set relative to the frame 52 in the block 855 above. For the fixture 30 shown in the Figures, the roll $\psi_v$ is not adjustable and is equal to zero.

As an overview of blocks 875-885, the technician calibrates the sensor 34 based on the position $(x, y, z)_v$ and orientation $(\varphi, \theta, \psi)_v$ of the target 32 relative to the vehicle 36. The technician instructs the computer 48 to compare the position $(x, y, z)_v$ and orientation $(\varphi, \theta, \psi)_v$ of the target 32 as determined in the blocks 860-870 with the position $(x, y, z)_s$ and orientation $(\varphi, \theta, \psi)_s$ of the target 32 as measured by the sensor 34. The position and orientation of the sensor 34 relative to the vehicle 36 equals the difference of the position $(x, y, z)_v$ and orientation $(\varphi, \theta, \psi)_v$ of the target 32 relative to the vehicle 36 and the position $(x, y, z)_s$ and orientation $(\varphi, \theta, \psi)_s$ of the target 32 relative to the sensor 34.

In the block 875, the technician inputs the position $(x, y, z)_v$ and orientation $(\varphi, \theta, \psi)_v$ of the target 32 into the computer 48. For example, the technician can enter the data with a device plugged into the OBD-II port or with a device that can connect to the computer 48 via a wireless connection.

Next, in a block 880, the computer 48 instructs the sensor 34 to detect the target 32. The sensor 34 outputs the position $(x, y, z)_s$ and orientation $(\varphi, \theta, \psi)_s$ of the target 32 relative to the sensor 34.

Next, in a block 885, the computer 48 determines the position and orientation of the sensor 34 in the coordinate system of the vehicle 36 by taking the difference of the position $(x, y, z)_v$ and orientation $(\varphi, \theta, \psi)_v$ of the target 32 relative to the vehicle 36 and the position $(x, y, z)_s$ and orientation $(\varphi, \theta, \psi)_s$ of the target 32 relative to the sensor 34. The sensor 34 is now calibrated, and the vehicle 36 is ready to be used with the sensor 34. After the block 885, the process 800 ends.

The disclosure has been described in an illustrative manner, and it is to be understood that the terminology which has been used is intended to be in the nature of words of description rather than of limitation. The adjectives "first," "second," "third," and "fourth" are used throughout this document as identifiers and are not intended to signify importance, order, or quantity. Many modifications and variations of the present disclosure are possible in light of the above teachings, and the disclosure may be practiced otherwise than as specifically described.

What is claimed is:

1. A method comprising:
   providing a fixture including a target in a field of view of a sensor mounted to a vehicle, wherein the target is detectable by the sensor, and the fixture includes a first rangefinding device and a second rangefinding device spaced from the first rangefinding device;
   measuring a first angle and first distance from the first rangefinding device to a first known point on the vehicle;
   measuring a second angle and second distance from the second rangefinding device to a second known point on the vehicle;
   determining a position and orientation of the target in a coordinate system relative to the vehicle based on the first angle, the first distance, the second angle, and the second distance; and
   calibrating the sensor based on the position and orientation of the target.

2. The method of claim 1, further comprising measuring a third angle and third distance from the first rangefinding device to the second known point on the vehicle, wherein determining the position and orientation of the target is also based on the third angle and third distance.

3. The method of claim 2, further comprising measuring a fourth angle and fourth distance from the second rangefinding device to the first known point on the vehicle, wherein determining the position and orientation of the target is also based on the fourth angle and fourth distance.

4. The method of claim 3, further comprising, before measuring each respective angle and distance to the respective known point, adjusting a vertical position of the respective rangefinding device relative to a frame of the fixture to be approximately the same as the respective known point.

5. The method of claim 1, wherein determining the position and orientation of the target includes determining two horizontal spatial coordinates and a yaw of the target based on the first angle, the first distance, the second angle, and the second distance.

6. The method of claim 1, wherein determining the position and orientation of the target includes measuring a vertical spatial coordinate of the target.

7. The method of claim 1, wherein determining the position and orientation of the target includes measuring a pitch and roll of the target.

8. The method of claim 1, wherein calibrating the sensor includes detecting the target by the sensor.

9. The method of claim 1, wherein calibrating the sensor includes determining a position and orientation of the sensor in the coordinate system relative to the vehicle.

10. The method of claim 9, wherein calibrating the sensor includes inputting the position and orientation of the target in the coordinate system relative to the vehicle into a computer in communication with the sensor.

11. The method of claim 1, wherein the rangefinding devices are laser rangefinders.

12. The method of claim 1, wherein the sensor is one of a cameras or a LIDAR.

13. The method of claim 1, wherein the fixture is not attached to the vehicle.

14. The method of claim 1, wherein the target is rotatable relative to a frame of the fixture about a horizontal axis of rotation.

15. The method of claim 14, further comprising rotating the target relative to the frame to a pitch that avoids a specular reflection from the sensor.

* * * * *